United States Patent
Geese et al.

(10) Patent No.: US 10,880,502 B2
(45) Date of Patent: Dec. 29, 2020

(54) SUB-PIXEL UNIT FOR A LIGHT SENSOR, LIGHT SENSOR, METHOD FOR SENSING A LIGHT SIGNAL, AND METHOD FOR GENERATING AN IMAGE

(71) Applicant: Robert Bosch GmbH, Stuttgart (DE)

(72) Inventors: Marc Geese, Ostfildern Kemnat (DE); Ulrich Seger, Leonberg-Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 16/317,123

(22) PCT Filed: Jun. 21, 2017

(86) PCT No.: PCT/EP2017/065167
§ 371 (c)(1),
(2) Date: Jan. 11, 2019

(87) PCT Pub. No.: WO2018/010921
PCT Pub. Date: Jan. 18, 2018

(65) Prior Publication Data
US 2019/0253645 A1    Aug. 15, 2019

(30) Foreign Application Priority Data
Jul. 13, 2016  (DE) .................... 10 2016 212 776

(51) Int. Cl.
*H04N 5/353*    (2011.01)
*H04N 5/378*    (2011.01)
(Continued)

(52) U.S. Cl.
CPC ......... *H04N 5/3535* (2013.01); *H04N 5/2357* (2013.01); *H04N 5/369* (2013.01);
(Continued)

(58) Field of Classification Search
CPC .... H04N 5/3535; H04N 5/379; H04N 5/2357; H04N 5/3696; H04N 5/37452; H04N 5/378; H04N 9/045
See application file for complete search history.

(56) References Cited

U.S. PATENT DOCUMENTS 5,962,844 A * 10/1999 Merrill ............... H04N 5/37452
250/214 A
2013/0293752 A1    11/2013 Peng et al.
(Continued)

FOREIGN PATENT DOCUMENTS

| JP | 2002526989 A | 8/2002 |
|---|---|---|
| JP | 2006050343 A | 2/2006 |

(Continued)

OTHER PUBLICATIONS

International Search Report for PCT/EP2017/065167, dated Aug. 14, 2017.

*Primary Examiner* — Lin Ye
*Assistant Examiner* — John H Morehead, III
(74) *Attorney, Agent, or Firm* — Norton Rose Fulbright US LLP; Gerard Messina (57) ABSTRACT

A sub-pixel unit for a light sensor. The sub-pixel unit includes a photodiode for converting a light signal (1202) into a photodiode signal, a modulator unit for producing a modulator signal using the photodiode signal, and a storage unit for storing a time-limited integral value of the modulator signal, and the system for reconstructing the spatial-temporal light signal from the sampled values.

13 Claims, 9 Drawing Sheets

(51) Int. Cl.
*H04N 9/04* (2006.01)
*H04N 5/369* (2011.01)
*H04N 5/235* (2006.01)
*H04N 5/3745* (2011.01)

(52) U.S. Cl.
CPC .......... H04N 5/3696 (2013.01); H04N 5/378 (2013.01); H04N 5/379 (2018.08); H04N 5/37452 (2013.01); H04N 9/045 (2013.01)

(56) References Cited

U.S. PATENT DOCUMENTS

| | | |
|---|---|---|
| 2015/0009375 A1 | 1/2015 | Agranov et al. |
| 2016/0150165 A1* | 5/2016 | Grauer .............. H01L 27/14634 348/280 |
| 2016/0344965 A1* | 11/2016 | Grauer ................. H04N 5/3594 |
| 2017/0180703 A1* | 6/2017 | Kovacovsky ........... G01S 17/46 |
| 2017/0324917 A1* | 11/2017 | Mlinar .................. H04N 5/372 |

FOREIGN PATENT DOCUMENTS

| | | |
|---|---|---|
| JP | 2010245955 A | 10/2010 |
| JP | 2012134963 A | 7/2012 |
| WO | 2008138543 A1 | 11/2008 |
| WO | 2015092794 A1 | 6/2015 |

\* cited by examiner

SUB-PIXEL UNIT FOR A LIGHT SENSOR, LIGHT SENSOR, METHOD FOR SENSING A LIGHT SIGNAL, AND METHOD FOR GENERATING AN IMAGE

BACKGROUND INFORMATION

The present invention is based on a device, a method, and a computer program.

The sampling of an image sensor takes place, generally, with an exposure time that is relatively short compared to a resulting image rate. Here, the exposure time acts as a low-pass filter that can be regarded in idealized fashion as a rectangle in the time domain.

SUMMARY

A sub-pixel unit for a light sensor, a light sensor, a method for sensing a light signal, a method for generating an image, and a device that uses at least one of these methods, as well as, finally, a corresponding computer program, are provided in accordance with the present invention. Advantageous developments and improvements of the device are described herein.

A sub-pixel unit for a light sensor is provided, the sub-pixel unit having the following features:
a photodiode for converting a light signal into a photodiode signal;
a modulator unit for producing a modulator signal using the photodiode signal; and
a storage unit for storing a time-limited integral value of the modulator signal.

A sub-pixel unit can be understood as a unit for sensing a light signal. The sub-pixel unit can be part of a pixel, including a plurality of sub-pixel units, of the light sensor or light sensors of the image sensor. A photodiode can be understood as a light-sensitive, possibly complex, element for converting a photon stream into an electron stream. A light signal can be understood for example as a temporally continuous and non-constant electromagnetic signal having an arbitrary spatial and temporal rate of change. A photodiode signal can be understood as an electrical output signal of the photodiode. Depending on the specific embodiment, the photodiode signal can for example be a continuous or time-discrete signal. A modulator unit can be understood for example as a continuous or time-discrete modulator. Alternatively or in addition, the modulator unit can for example also be realized as a time-discrete multiplexer. A modulator signal can be understood as an output signal of the modulator unit. The storage unit can be for example a capacitor.

In accordance with the present invention, a parameterizable temporal low-pass filter can be realized through the use of sub-pixels from a respective modulator in combination with at least one storage unit. For this purpose, using a spatial low-pass filter, a light signal is correctly sampled in the time and space domains using a multiplicity of light sensors (pixels) that are configured in a regular grid structure on an image sensor.

This is done by exploiting the fact that the necessary temporally overlapping integration of the light signals is realized by the spatially separate sub-pixel units, in that these sub-pixel units produce the integration signal with a temporal overlap to one another.

In addition, the present invention enables a system for reconstructing a spatial-temporal light signal from the sampled values.

According to a specific embodiment of the present invention, the photodiode can be designed to supply a time-discrete signal, having a time schema, to the modulator unit as the photodiode signal. The modulator unit can be designed as a time-discrete modulator or, in addition or alternatively, as a time-discrete multiplexer, in order to use the time schema for the production of the modulator signal. In this way, a temporally discrete low-pass modulator can be realized for time-pulsed integration with pulsed exposure times. According to a specific embodiment of the present invention, only two possibilities are provided: a time-discrete modulator and a time-continuous modulator, the multiplexer not being provided.

In addition, the photodiode can be designed to supply a continuous signal to the modulator unit as the photodiode signal. The modulator unit can be designed as a continuous modulator in order to produce a temporally modulated current as the modulator signal. In this way, a temporally continuous low-pass modulator for continuous integration can be realized.

According to another specific embodiment of the present invention, the sub-pixel unit can have a buffer unit for buffering the photodiode signal. The modulator unit can be designed to produce the modulator signal using a photodiode signal buffered by the buffer unit. The buffer unit can for example be a capacitor. In this way, pulses of the photodiode signal can be buffered for the collection of electrons.

In addition, the modulator unit can be designed to modify the photodiode signal in order to produce the modulator signal using a multiplier. For example, the multiplier can be time-dependent. In this way, the photodiode signal can be amplified or attenuated.

In addition, the present invention provides a light sensor having a grid structure of a multiplicity of pixel units, the pixel units each being subdivided into at least two sub-pixel units according to one of the above specific embodiments, and the sub-pixel units of each pixel unit being assigned respectively to a different phase for the phase-shifted sampling of the light sensor.

According to a specific embodiment of the present invention, the light sensor can be realized having a layer composite of a sensor layer and a signal processing layer. The photodiodes of the sub-pixel units can be situated in the sensor layer, while the modulator units, or, in addition or alternatively, the storage units of the sub-pixel units can be situated in the signal processing layer. The sensor layer and the signal processing layer can for example each be a silicon-based functional unit or a wafer. In this way, the light sensor can be miniaturized efficiently and at low cost.

The light sensor or image sensor can in addition have a signal processing unit for processing the integral values stored by the storage units of the sub-pixel units. In this way, a complex signal preparation can be carried out.

According to a specific embodiment of the present invention, the signal processing unit can be situated in the signal processing layer. In this way, the production of the light sensor can be simplified.

The present invention also provides a method for sensing a light signal using a sub-pixel unit, the sub-pixel unit having a photodiode, a modulator unit, and a storage unit, the method including the following steps:
conversion of the light signal into a photodiode signal using the photodiode;
production of a modulator signal by the modulator unit, using the photodiode signal; and
storing of a time-limited integral value of the modulator signal, using the storage unit.

In addition, the present invention provides a method for generating an image using a light sensor according to one of the above specific embodiments, the method including the following steps:

reading out the sub-pixel units each assigned to a different phase, through temporally phase-shifted sampling of the light sensor, in order to store the integral values of the respective modulator signals of the sub-pixel units; and processing the integral values in order to generate the image.

These methods can be implemented for example in software or hardware, or in a mixed form of software and hardware, for example in a control device.

In addition, the present invention provides a device that is designed to carry out, control, or implement the steps of a variant of a method presented here in corresponding devices. Through this variant embodiment of the present invention in the form of a device as well, the object of the present invention can be achieved quickly and efficiently.

For this purpose, the example device can have at least one computing unit for processing signals or data, at least one storage unit for storing signals or data, at least one interface to a sensor or to an actuator for reading in sensor signals from the sensor or for outputting data signals or control signals to the actuator, and/or at least one communication interface for reading in or outputting data that are embedded in a communication protocol. The computing unit can be for example a signal processor, a microcontroller, or the like, and the storage unit can be a flash memory, an EPROM, or a magnetic storage unit. The communication interface can be designed to read in or output data wirelessly and/or in line-bound fashion, and a communication interface that can read in or output line-bound data can for example electrically or optically read these data in from a corresponding data transmission line or output them to a corresponding data transmission line.

In the present context, a device can be understood as an electrical apparatus that processes sensor signals and outputs control signals and/or data signals as a function thereof. The device can have an interface that can be realized as hardware and/or as software. In the case of a realization as hardware, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules present for example on a microcontroller alongside other software modules.

In an advantageous embodiment, the device carries out a controlling of the vehicle. For this purpose, the device can for example make use of sensor signals such as acceleration, pressure, steering angle, or environmental sensor signals. The controlling takes place via actuators such as brake or steering actuators or an engine control device of the vehicle.

Also advantageous is a computer program product or computer program having program code that can be stored on a machine-readable bearer or storage medium such as a semiconductor memory, a hard drive memory, or an optical memory, and is used to carry out, implement, and/or control the steps of the method according to one of the specific embodiments described above, in particular when the program product or program is executed on a computer or on a device.

Exemplary embodiments of the present invention are shown in the figures and are explained in more detail below.

BRIEF DESCRIPTION OF THE DRAWINGS

In the following description of advantageous exemplary embodiments of the present invention, identical or similar reference characters are used for elements shown in the various Figures and having similar function, and repeated description of these elements is omitted.

DETAILED DESCRIPTION OF EXAMPLE EMBODIMENTS

Figure 1:
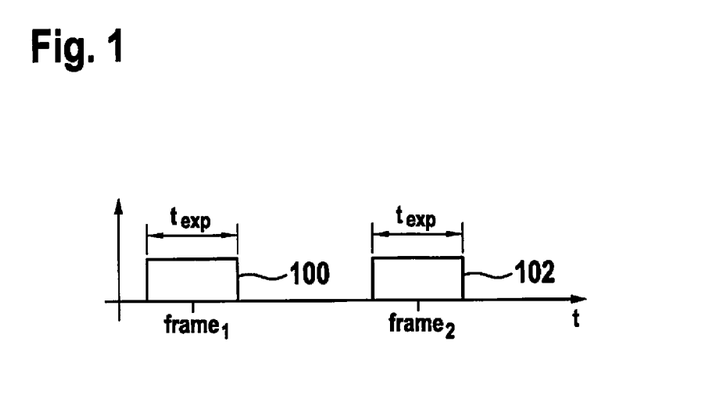
FIG. 1 shows a schematic representation of a currently typical temporal sampling.

FIG. 1 shows a schematic representation of a currently typical temporal sampling. Shown are a frame 1 with reference character 100, and a frame 2 with reference character 102, each representing an exposure time $t_{exp}$.

Figure 2:
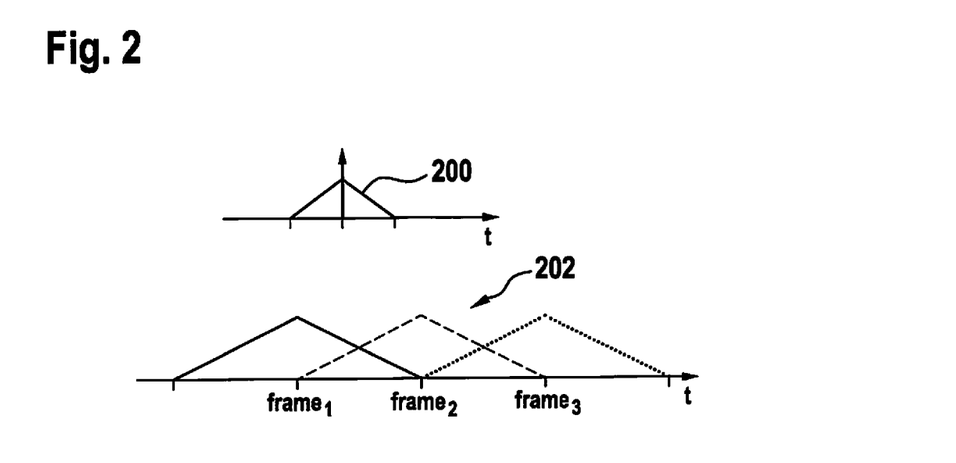
FIG. 2 shows a schematic representation of a low-pass characteristic of a target sampling, as well as an exposure schema for ideal temporal sampling.

FIG. 2 shows a schematic representation of a low-pass characteristic 200 of a target sampling, as well as an exposure schema 202 for ideal temporal sampling with corresponding overlapping low-pass filters, here shown as temporal modulation with a delta function.

Figure 3:
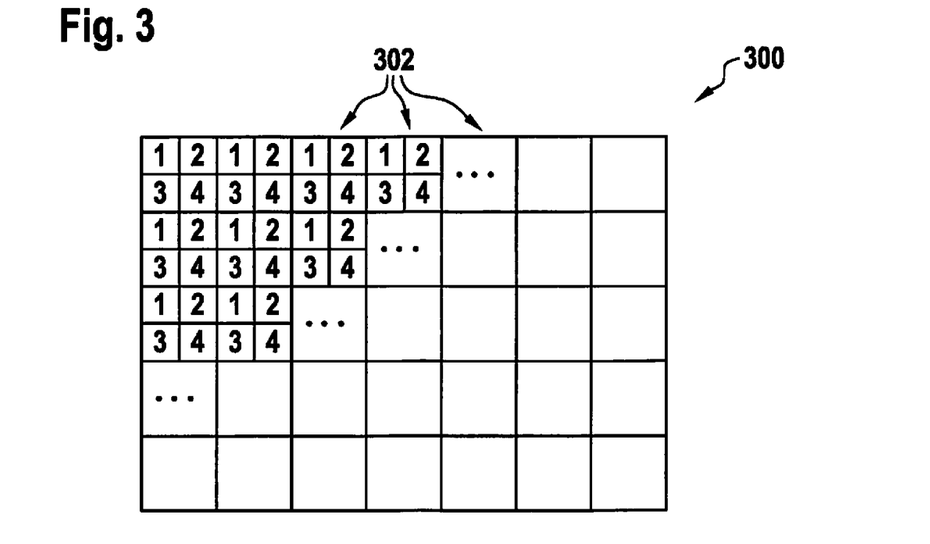
FIGS. 3-10 show schematic representations of a light sensor according to various exemplary embodiments.

FIG. 3 shows a schematic representation of a light sensor 300 according to an exemplary embodiment, here a monochromatic filter array. Shown is a schematic design of a pixel structure for temporally correct sampling in an overlapping 4-schema. Light sensor 300 has a grid structure of a plurality of pixel units 302, here rectangular in shape, each subdivided into four sub-pixel units 1, 2, 3, 4 each assigned to a different phase. Sub-pixel units 1, 2, 3, 4 are for example also rectangular in shape. Through such a division of pixel units 302 each into four sub-pixel units 1, 2, 3, 4, light sensor 300 can be read out in time-shifted fashion in four phases, and thus in temporally overlapping fashion.

Figure 4:
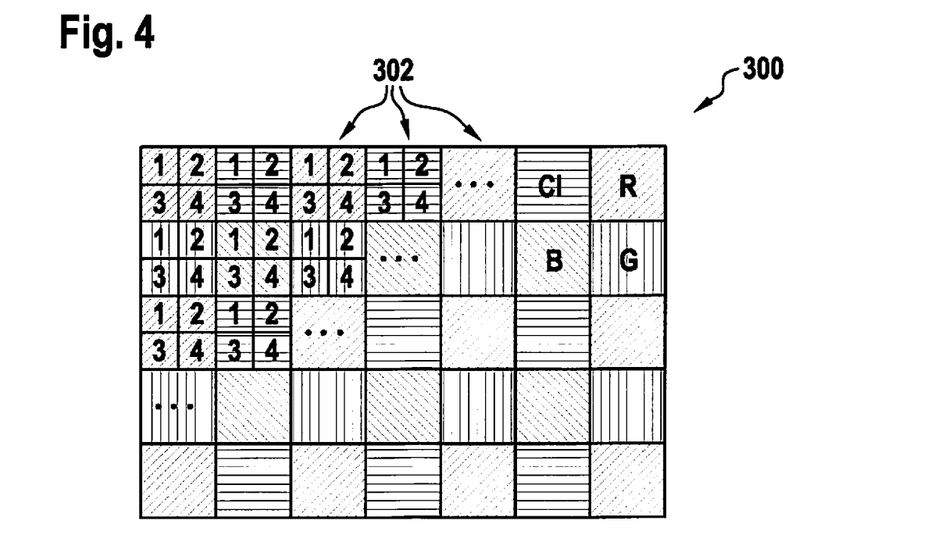

FIG. 4 shows a schematic representation of a light sensor 300 according to an exemplary embodiment. Differing from FIG. 3, here light sensor 300 is realized as a four-channel color filter array having the example channels red (R), green (G), blue (B), and clear (C).

Figure 5:
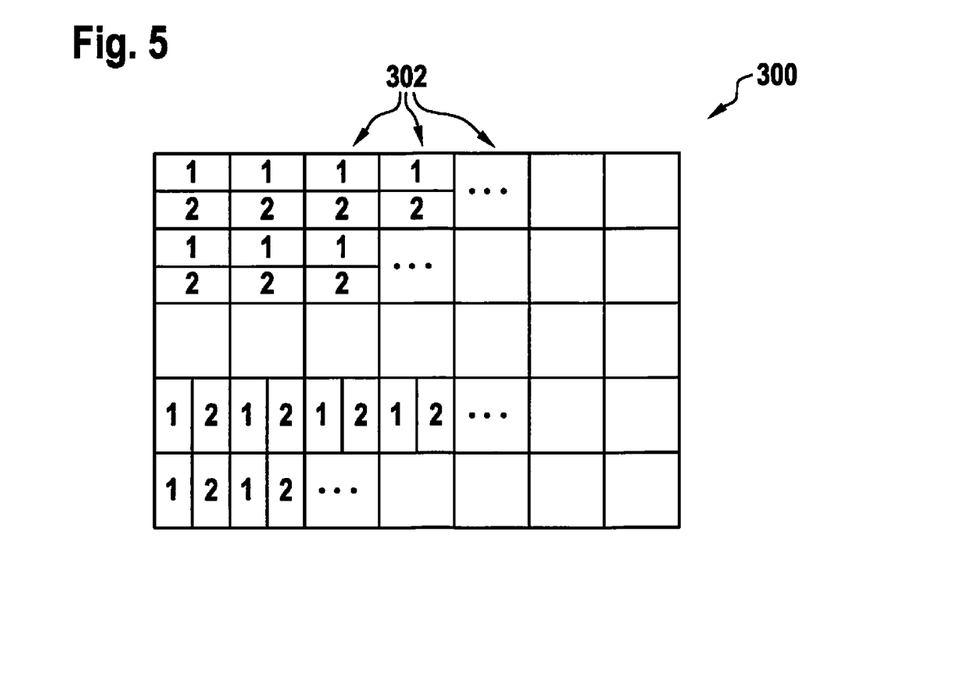

FIG. 5 shows a schematic representation of a light sensor 300 according to an exemplary embodiment. As in FIG. 3, the light sensor is realized as a monochromatic filter array. Differing from FIG. 3, here the individual pixel units 302 are subdivided into only two sub-pixel units 1, 2, pixel units 302 being divided either horizontally or vertically. Through the division of pixel units 302 each into two sub-pixel units 1, 2, a time-shifted, time-overlapping reading out in two phases is enabled.

Figure 6:
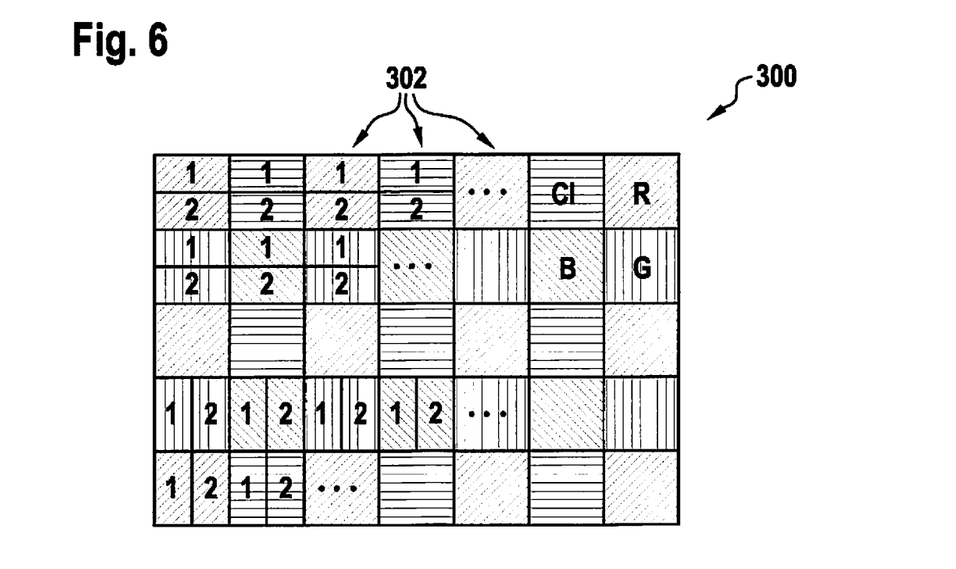

FIG. 6 shows a schematic representation of a light sensor 300 according to an exemplary embodiment. Light sensor 300 corresponds essentially to the light sensor described on the basis of FIG. 5, with the difference that, similar to FIG. 4, light sensor 300 is realized as a four-channel color filter array.

Figure 7:
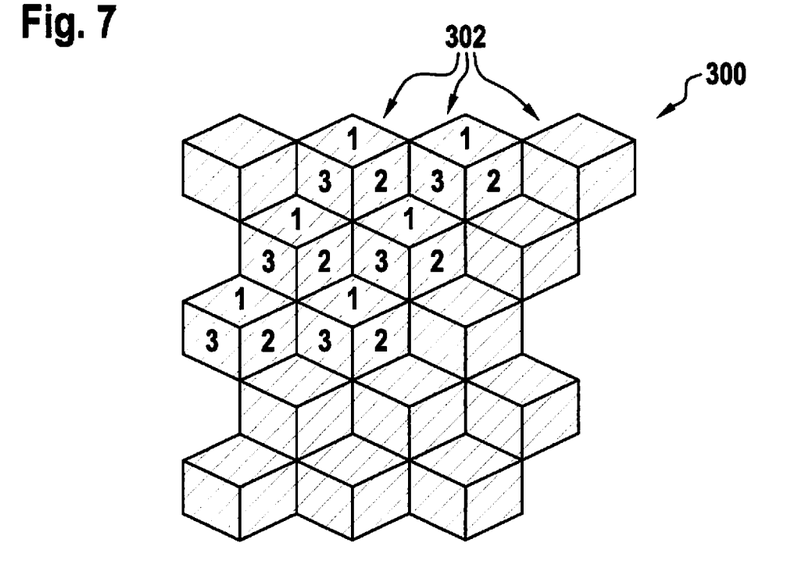

FIG. 7 shows a schematic representation of a light sensor 300 according to an exemplary embodiment. Differing from FIGS. 3 through 6, according to this exemplary embodiment pixel units 302 are subdivided into three sub-pixel units 1, 2, 3 for a time-shifted, time-overlapping reading out in three phases. Shown is a schematic design of a pixel structure for temporally correct sampling in an overlapping three-phase schema in a hexagonal grid structure in a monochromatic light sensor 300 without a color filter array.

Figure 8:
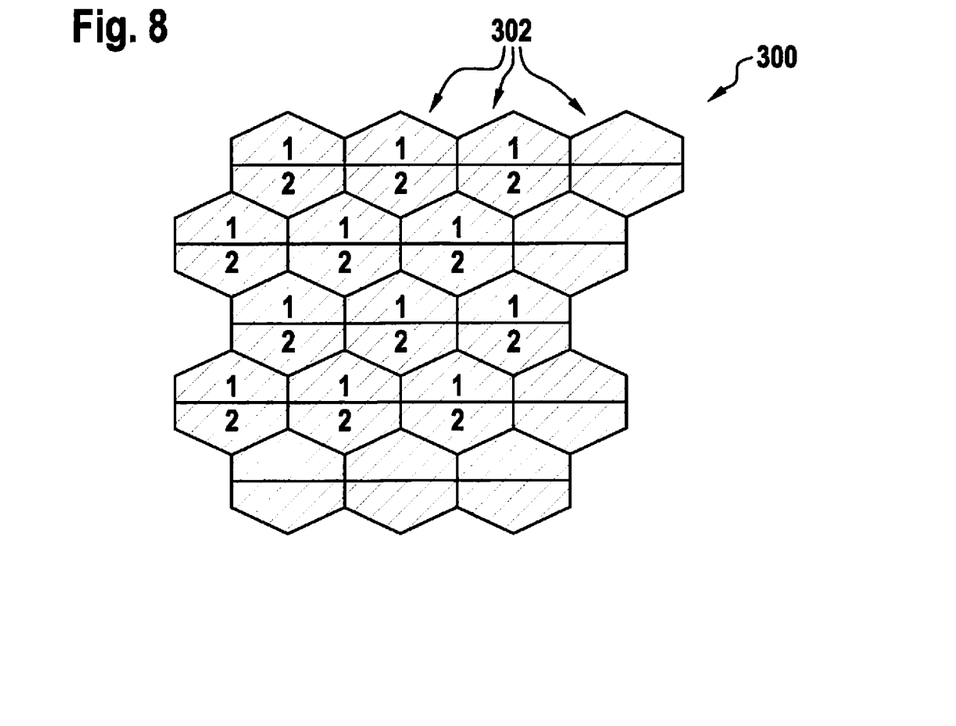

FIG. 8 shows a schematic representation of a light sensor 300 according to an exemplary embodiment. As in FIG. 7, shown here is a schematic design of a pixel structure for temporally correct sampling, but in this case in an overlapping two-phase schema in a hexagonal grid structure in a monochromatic light sensor 300 without a color filter array. Differing from FIG. 7, here pixel units 302 are subdivided into only two sub-pixel units 1, 2 for a time-shifted, time-overlapping reading out in two phases.

Figure 9:
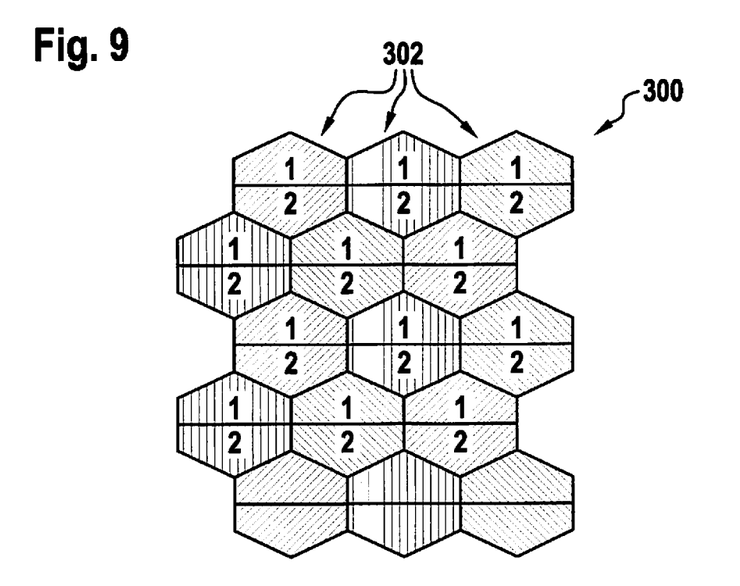

FIG. 9 shows a schematic representation of a light sensor 300 according to an exemplary embodiment. Light sensor 300 corresponds substantially to the light sensor described on the basis of FIG. 8, with the difference that here light sensor 300 is realized having a three-channel color filter array.

Figure 10:
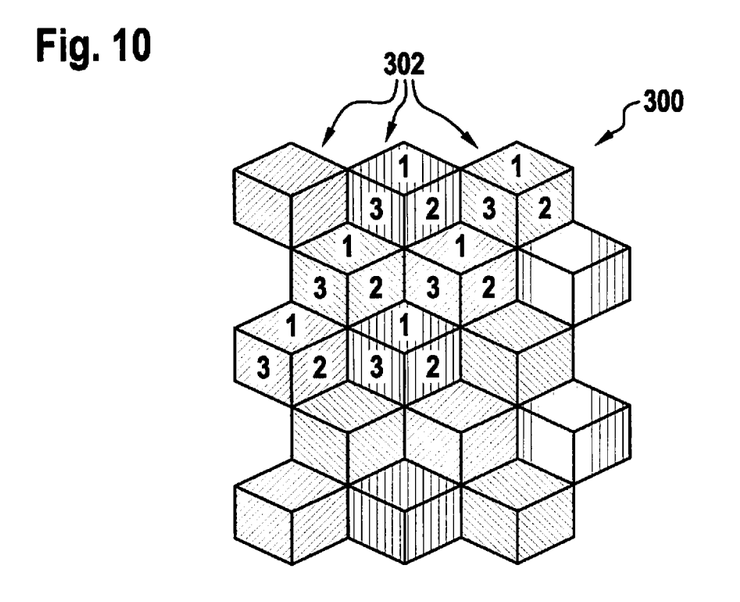

FIG. 10 shows a schematic representation of a light sensor 300 according to an exemplary embodiment. Light sensor 300 corresponds substantially to the light sensor described on the basis of FIG. 7, with the difference that here light sensor 300 is realized having a three-channel color filter array.

Figure 11:
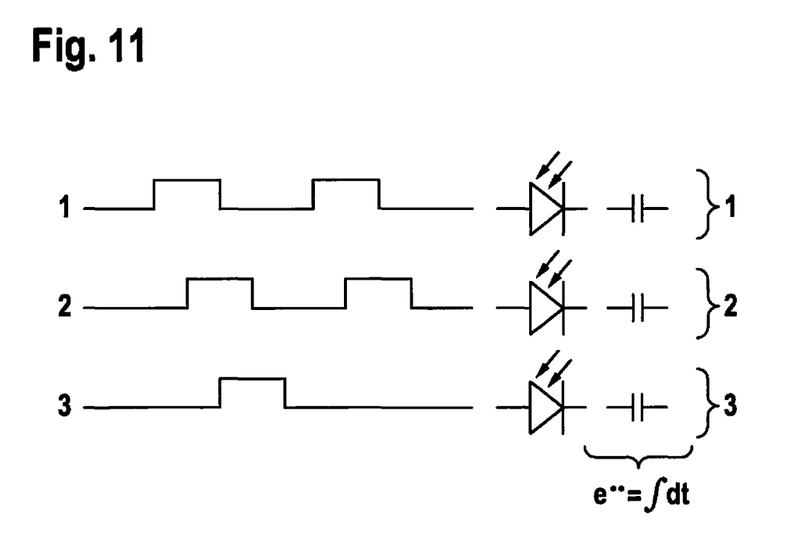
FIG. 11 shows a schematic representation of a sampling design, in an offset three-phase schema with rectangular integration time.

FIG. 11 shows a schematic representation of a sampling in an offset three-phase schema with rectangular integration time. Shown is the realization of a low-pass filter having equilibrated integration using three sub-pixel units 1, 2, 3. The respective output signals of sub-pixel units 1, 2, 3 are shown alongside sub-pixel units 1, 2, 3.

Figure 12:
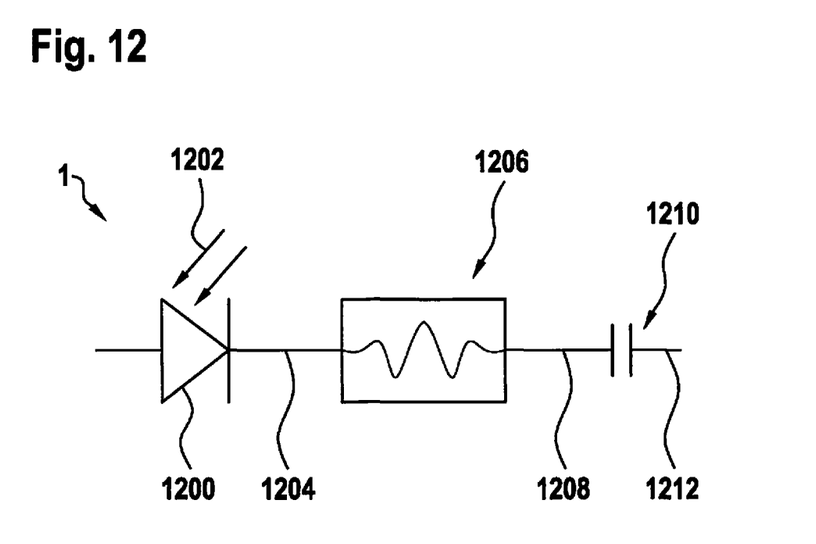
FIG. 12 shows a schematic representation of a sub-pixel unit according to an exemplary embodiment.

FIG. 12 shows a schematic representation of a sub-pixel unit 1 according to an exemplary embodiment. Sub-pixel unit 1 can be a component of a light sensor described above on the basis of FIGS. 3 through 11. Sub-pixel unit 1 includes a photodiode 1200 for converting a light signal 1202 into a photodiode signal 1204, a modulator unit 1206 for producing a modulator signal 1208 using photodiode signal 1204, and a storage unit 1210, here a storage capacitance in the form of a capacitor, for storing a time-limited integral value 1212 of modulator signal 1208. According to this exemplary embodiment, modulator unit 1206 is realized as a temporally continuous low-pass modulator for continuous integration.

Figure 13:
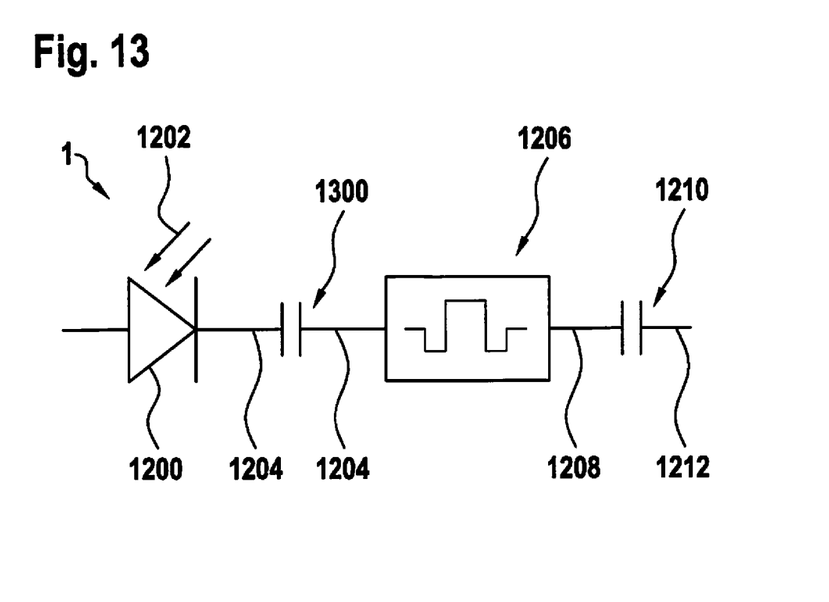
FIG. 13 shows a schematic representation of a sub-pixel unit according to an exemplary embodiment.

FIG. 13 shows a schematic representation of a sub-pixel unit 1 according to an exemplary embodiment. Differing from FIG. 12, here a schematic design of sub-pixel unit 1 is shown having a temporally discrete low-pass modulator as modulator unit 1206. Modulator unit 1206 is, depending on the exemplary embodiment, a time-discrete modulator or multiplexer for time-pulsed integration with pulsed exposure time. For this purpose, an optional buffering unit 1300, for buffering pulses of photodiode signal 1202, is connected between photodiode 1200 and modulator unit 1206. Correspondingly, modulator unit 1206 is designed to produce modulator signal 1208 using the pulses buffered by buffering unit 1300. Storage unit 1210 functions as a results memory.

Figure 14:
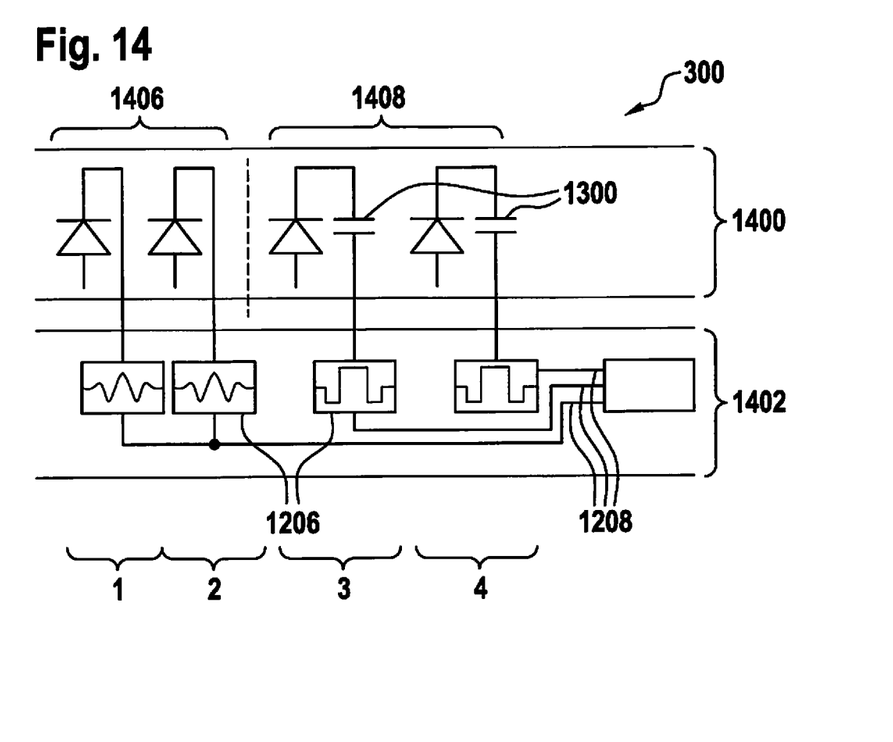
FIG. 14 shows a schematic representation of a light sensor according to an exemplary embodiment.

FIG. 14 shows a schematic representation of a light sensor 300 according to an exemplary embodiment, such as a light sensor as described above on the basis of FIGS. 3 through 13. According to this exemplary embodiment, light sensor 300 is realized having a layer composite of a sensor layer 1400, for photon-electron conversion using the respective photodiodes 1200 of sub-pixel units 1, 2, 3, 4, and a signal processing layer 1402 for a complex signal preparation, also called the signal preparation level. The respective modulator units 1206 of sub-pixel units 1, 2, 3, 4 are situated in signal processing layer 1402. In addition, signal processing layer 1402 is realized having a signal processing unit 1404 for the processing of the respective modulator signals 1208. The storage unit for storing the integral values is for example integrated in signal processing unit 1404.

According to this exemplary embodiment, layer composite 1400 has a first segment 1406 for continuous integration and a second segment 1408, here situated adjacent to the first segment, for time-discrete integration. The buffering units 1300 belonging to second segment 1408 are for example situated in sensor layer 1400.

The distribution shown in FIG. 14 of the pixel structure in sensor layer 1400 for the photon-electron conversion, and the signal processing layer 1402 for the signal preparation, is realized for example in stacked die technology.

Figure 15:
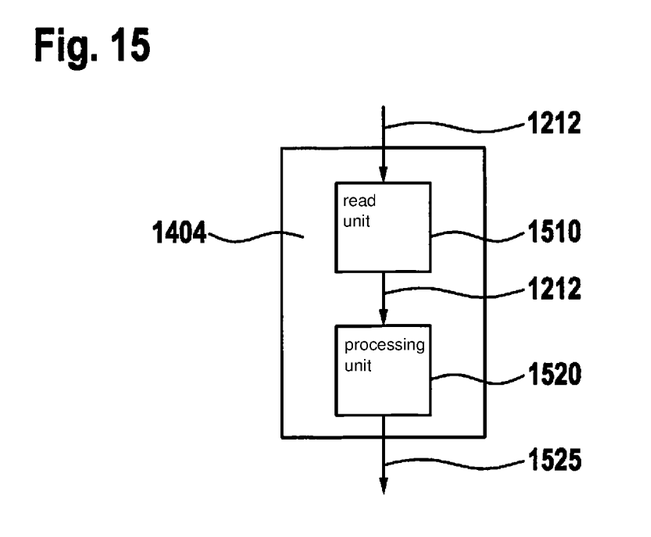
FIG. 15 shows a schematic representation of a device according to an exemplary embodiment.

FIG. 15 shows a schematic representation of a device 1404 according to an exemplary embodiment, also referred to as signal processing unit above. Device 1404 includes a read unit 1510 for reading out the sub-pixel units, each assigned to a different phase, through phase-shifted sampling of the light sensor. Read unit 1510 receives the integral values 1212 stored by the respective storage units of the sub-pixel units. A processing unit 1520 is designed to process the integral values 1212 in order to generate an image 1525.

Figure 16:
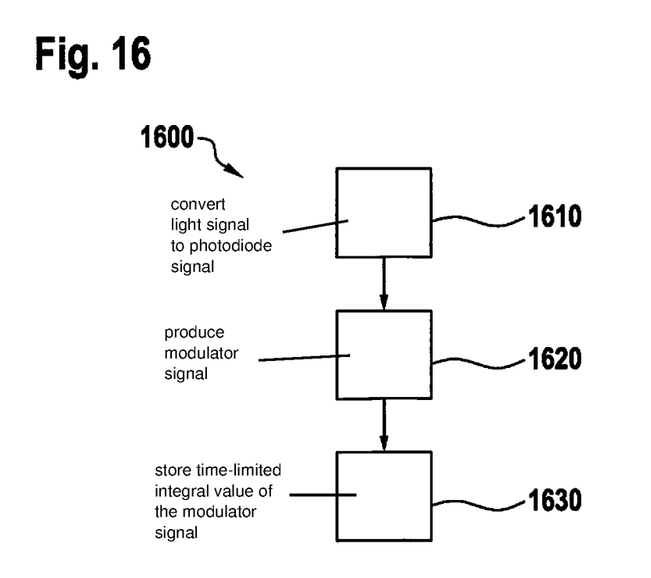
FIG. 16 shows a flow diagram of a method according to an exemplary embodiment.

FIG. 16 shows a flow diagram of a method 1600 according to an exemplary embodiment. Method 1600 for sensing a light signal can be carried out for example by a sub-pixel unit as described above on the basis of FIGS. 3 through 15. In a step 1610, the light signal is converted into a photodiode signal by the photodiode. In a further step 1620, the modulator signal is produced using the photodiode signal. Finally, in a step 1630 the time-limited integral value of the modulator signal is stored by the storage unit.

Figure 17:
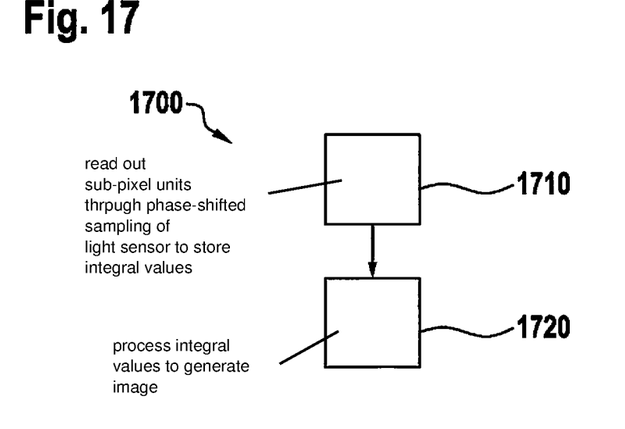
FIG. 17 shows a flow diagram of a method according to an exemplary embodiment.

FIG. 17 shows a flow diagram of a method 1700 according to an exemplary embodiment. Method 1700 for generating an image can be carried out for example by a device as described above on the basis of FIG. 15. In a step 1710, the sub-pixel units each assigned to a different phase are read out through phase-shifted sampling of the light sensor in order to store the integral values of the respective modulator signals of the sub-pixel units. In a further step 1720, the integral values are processed in order to generate the image.

Below, the present invention is described again in other words on the basis of FIGS. 1 through 17.

The present invention creates a pixel readout schema and an associated spatial pixel structure, enabling a temporally correct sampling of a light signal. For this purpose, hardware structures are proposed that enable a parameterization of a temporal low-pass filter, and thus a correct sampling.

Modern image sensors standardly function according to the following design. An optical system produces a light image on a flat sensor, also called an image sensor or imager. The image sensor samples this image spatially and temporally. The temporal sampling is determined by the image rate, and in some designs is also determined by the individual light sensor sampling rate.

Here, the standard camera components perform the following functions. The optical system acts as a spatial low-pass filter. Today's light sensors are made up of several million individual light sensors, each light sensor representing a spatial sampling point. The exposure time acts as a temporal low-pass filter.

For an aliasing-free sampling, the low-pass filter should be adapted to the sampling frequency in such a way that, in accordance with the Shannon-Nyquist sampling theorem, the sampling frequency is at least twice as large as the limit frequency of the low-pass filter. Moreover, the signal should always run through the low-pass filter before the sampling.

If this does not take place, then generally the sampled signal will contain aliasing artifacts. The spatial aliasing effects are standardly recognizable at edges having high contrast as color fringes, at point-like objects by disappearing and reappearing, and at objects having a regular periodic pattern as the so-called Moiréeffect.

In the time signal, aliasing effects show up as rolling shutter effects, in which a moving straight object is imaged as curved, by "wagon wheel" effects in which, starting from a particular speed, a wheel appears to rotate backwards, and by problems in the recording of pulsed light sources such as LED traffic signs or rear lights of vehicles. Such effects also occur in human vision, and show that even here temporal aliasing effects cannot be completely prevented.

For applications in the area of machine vision, the optical flux is an important auxiliary parameter. The quality of the optical flux can be significantly increased by a temporally correctly sampled signal.

The functioning of current image sensors is based on a relatively short exposure time relative to the resulting image rate. The exposure time acts as a low-pass filter that can be regarded in idealized fashion as a rectangle in the time domain.

In the frequency space, the rectangular low-pass filter having width $t_{exp}$ is represented as an si function:

$$rect\left(\frac{t}{t_{exp.}}\right) \circ\!\!-\!\!\bullet\ si(\pi f t_{exp.})$$

The first zero crossing of the si curve is:

$$\pi f t_{exp.} = \pi$$
$$f_{limit} = \frac{1}{t_{exp.}}$$

and is at the same time a standard approximation for the limit frequency of the low-pass filter.

If standard exposure times of $t_{exp} \approx 500$ µs are compared with standard image refresh rates or sampling frequencies of $t_{frame} \approx \frac{1}{30} \approx 33$ ms, then the sampling frequency $f_{sample}$ and the limit frequency of the low-pass filter $f_{Nyq}$, result as:

$$f_{sample} = 30$$
$$f_{Nyq.} = \frac{1}{0.5 \cdot 10^{-3}} = 2 \cdot 10^3$$

However, according to the sampling theorem, the following should hold:

$$f_{limit} \approx f_{Nyq.}$$

$$f_{Nyq.} \leq \frac{1}{2} f_{sample}$$

$$\Rightarrow \text{target:}\ \frac{f_{Nyq.}}{f_{sample}} \leq \frac{1}{2}$$

$$\Rightarrow \text{actual:}\ \frac{f_{Nyq.}}{f_{sample}} \leq \frac{2}{3} \cdot 10^2$$

FIG. 1 shows the currently standard sampling schema. This significantly violates the Nyquist theorem. This is not a problem in real-world conditions as long as high frequencies do not occur, such as in the case of slowly moving clouds or a photograph.

In the area of video-based driver assistance, rapid changes in the scene are particularly important in particular in standard cases of application, for example in the calculation of the optical flux at pedestrian extremities, or in the detection of LED lights such as brake lights or changing traffic signs. For this reason, the light signal should also be sampled in temporally correct fashion. In addition, it would be important to be notified of any violation of the sampling theorem.

For a temporally correct sampling, the following should be met:

$$\frac{f_{Nyq.}}{f_{sample}} \leq \frac{1}{2}$$

However, this also yields the result that $$2 f_{Nyq.} \leq f_{sample}$$
$$\Rightarrow 2 \frac{1}{t_{exp.}} \leq \frac{1}{t_{frame}}$$
$$\Rightarrow t_{exp.} \geq 2 t_{frame}$$

This means that the exposure time for a correct sampling should last twice as long as a standard frame. In addition, for a better low-pass filter a temporally adapted signal modeling is also required. FIG. 2 shows a Nyquist-conformal sampling schema.

In the Nyquist-conformal case, the actual frame rate is determined by the width of the low-pass filter. In standard image sensors, an integration time longer than 1 ms in daytime conditions is however possible only with difficulty, due to boundary conditions such as SNR or a design that works in nighttime conditions. As a result, in a temporally correct sampling the frame rate also increases significantly (more than 1 kHz would be required).

These high data rates are difficult to process, and for this reason should be converted back down to the standard 30 Hz ahead of time. This can be done for example through downstream signal processing.

However, here a correct downsampling in turn requires a low-pass filter, followed by a sampling at the desired image rate. Because the output signal does not contain any aliasing effects, the final signal with reduced frame rate will also contain no aliasing given a correct downsampling.

However, it can happen that the image signal converted down to a low image rate also contains lower edge sharpness in the spatial dimensions than at the high image rate. This happens in particular because an aliasing-free reduction of the image rate, when realized according to the existing art, causes a longer virtual exposure time, resulting in blending of the image signals in this region.

In the temporal sampling of the light signal, a temporal low-pass filter is therefore used. This is provided on the one hand by the exposure time.

The fact that the standard image rates and exposure times are not adequate for this is already known in spatial sampling, referred to by the term standard sampling. While, spatially, the un-sharpness of the optics ensures that the signal is low-pass-filtered beyond the pixel dimension, the corresponding counterpart for the temporal dimension is missing.

According to the approach described here, a temporally correct sampling is now realized as follows: on the one hand via a temporal offset as spatial realization in the pixel plane, and on the other hand via a suitable pixel design for realizing the temporal low-pass filter.

According to the above, the light signals at each spatial sampling point would however have to be differently weighted at the temporal recording times and then integrated in order to achieve a temporally correct sampling. The temporally different weighting here represents the characteristic of the low-pass filter. The temporally different weighting and the generation of the measurement values are to be realized here in such a way that the continuous light signal at each time always influences at least two or more of the generated temporal sampling measurement values. This can also be seen in FIG. 2.

Due to the overlapping of the temporal sampling, two or more storage units are now in fact required. These storage units are realized for example by electronic capacitors. While the first sampling time is not yet finished with its temporal integration, the second sampling time is already being integrated. When the first frame is terminated, the third frame begins with its integration, etc. Because the measurement values of the first frame also require a finite read time, in practice probably not just two but three storage units are used. The realization of the temporally overlapping sampling values is described below.

If the post-processing in the signal generation block is designed with adequate outlay, the signal can now be reconstructed at any desired time between the first and the last time from the signal of the three storage units. Ultimately, the target frame rate is reached through a connection one after the other or expansion of these reconstruction steps.

Here, however, a correct downsampling again requires a low-pass filter followed by a sampling with the desired image rate. Because the initial signal does not contain any aliasing effects, the final signal, with reduced frame rate, will also contain no aliasing, given correct downsampling. This can be counteracted by using a spatial-temporal filter for the calculation of the image signal. This filter can be arbitrarily complex and can have, inter alia, the following properties:
 limiting of the input parameters taken into account to measurement values from a limited neighborhood, e.g. the immediate or next-to-immediate neighborhood;
 limiting the input parameters taken into account to measurement values of a limited time window, e.g. only the last five temporal measurement values;
 calculation of the input values as a function of their local position;
 calculation of the input values as a function of the time of their recording;
 calculation of the input values using non-linear operators such as minimum, maximum, median;
 calculation of the input values using linear operators such as convolutions, multiplications, and additions;
 calculation of the input values explicitly taking into account spatial and temporal relationships; and
 calculation of the input values taking into account various modeling assumptions, in particular taking into account models for spatial or temporal localization of pulse-width-modulated light sources, such as LEDs of variable traffic signs and rear lights in motor vehicles, with the degrees of freedom: refresh rate, duty cycle, and phase position to the current image rate.

In addition, the signal generation block calculates for example additional signal features, such as an average temporal and or spatial (local) change in the signal between two times, which can cause a reduction of the data rate. In addition, from the individual exposures frames 1 to 3 it is optionally calculated how large the temporal and/or spatial (local) variance of the signal is.

From the above-named intermediate measurement values, features having a few bits of information content can be extracted through the application of parameterizable threshold values. In particular, the formation of one or more threshold values can be used to mark a spatial-temporal signal volume as a flickering, i.e., pulsed, light source, for example by evaluating a temporal signal variance relative to a temporal mean value.

If for example the signal of a sensor element in a sampling period deviates by more than 25 percent, then the signal can be marked, with a marker bit, as fluctuating, which can be useful for the detection of artificial light sources. The threshold should be appropriately adaptable in terms of time or also location.

In addition to the temporal alias-free sampling, there are also further examples of applications that can be performed in the post-processing unit, such as the extraction of a precise depth estimation given structured illumination, by evaluating a spatial-temporal signal volume, or the determination of temporal characteristics such as frequency or duty cycle of various light sources for further processing, for example in classifiers of different vehicle types and their properties. In particular, knowledge of the size of the vehicle is very important for video-based driver assistance.

In accordance with the present invention, the temporally overlapping integration times are transferred into the spatial dimension. For this purpose, the fact is exploited that the optical system represents a spatial low-pass filter that makes it possible to sample the space without significant aliasing artifacts. If this spatial low-pass filter is realized in such a way that the spatial sampling produces an oversampling, then the light sensor field can be divided into an N-regular grid, of which each sub-grid carries out its integration in temporally overlapping fashion with the other sub-grids. If warranted, during the integration time a temporal multiplication of the signal is built in in order to improve the temporal low-pass characteristic.

As mentioned above, at least three storage units are required. FIGS. 3 through 6 shows such a design schematically for typical rectangular pixels, with the various possible realizations of different color filter array types, here a monochromatic filter array and a four-channel color filter array having the channels clear, blue, red, and green.

In combination with a hexagonal grid, in particular given the use of three light sensors an economical design can be achieved with regard to the required sensor surface. FIGS. 7 through 10 show an example of the design for realization in a hexagonal light sensor grid having hexagonal pixels. The depicted possible realizations are only a sample selection. In principle, a large number of different combinations can be realized, based on the following:

number of channels of the color filter array (x-channel CFA);

number of required overlapping time phases, for example 2-, 3-, or 4-overlap; and shape and configuration of the pixels in the spatial grid.

The methods described here can be realized by subdividing light sensors 300 on the sensor surface into a plurality of groups. Each of these groups then corresponds to a phase-shifted sampling grid in the spatial representation. Each of these sampling grids can be controlled separately with a temporal phase offset to the other grids.

The produced light signals standardly represent a number of collected electrons in a capacitor. The signals of overlapping exposure times should be calculated together with one another in order to obtain an aliasing-free signal. In addition, the spatial structure of the given design and the characteristic of the temporal low-pass filter can also be taken into account. Mathematically, the optical low-pass filter and the temporal low-pass filter represent a unit by which the low-pass filtering of the spatial-temporal light signal is described. This should be taken into account during the implementation of the later signal reconstruction.

If, as is standard today, the light sensors are read out with a constant temporally offset exposure time, then the low-pass filter is a sinc function in the frequency domain. Ideal is a rectangular filter in the frequency domain, which requires a sinc modulation in the time domain. For example, the low-pass characteristic can also be realized using a Lanczos filter, or a mixture of delta and sinc filters. FIG. 11 shows the design of an equilibrated integration.

A possibility for realizing a parameterizable temporal low-pass filter supplies the time-continuous photodiode signal 1204 to a low-pass modulator. This modulator produces a temporally modulated current that is integrated in a capacitor 1210, and from there is supplied to post-processing or to the spatial-temporal light signal reconstruction. FIG. 12 schematically shows the design.

A possibility for realizing a parameterizable temporal low-pass filter can be realized by the temporal discretization of the photodiode signal 1204. For this purpose, photodiode 1200 is read out several hundred times in the low-pass time span.

For example, the collected electrons are first amplified corresponding to the temporally current weight of the low-pass filter, for example using a time-dependent multiplier, which can also be negative. This takes place for example through buffering in a small capacitor with subsequent amplification and back-conversion into a current. The generated signal is thus weighted per pulse and supplied to the storage capacitor, where it is integrated. Additionally, in this design the pulse lengths can also be adapted corresponding to the low-pass characteristic in order to achieve an improved signal-to-noise ratio.

In classical semiconductor processes, circuits are produced alongside one another in a 2-D design. However, modern semiconductor processes are capable of placing a plurality of circuits one over the other and connecting them. This is called stacked die technology. For the case of temporally correct sampling, more complex hardware structures are required than in current image sensors. Therefore, according to an exemplary embodiment the photon-to-electron conversion takes place in an upper layer 1400, while the low-pass modulation, and if warranted further post-processing steps such as gradient formation or signal reconstruction at the frame time, are relocated to a lower layer 1402. This lower layer 1402 is optionally produced in a different manufacturing technology than upper layer 1400, for example in 14-nm or 7-nm technology, which enables significantly more complex standard signal preparation steps.

If an exemplary embodiment has an "and/or" linkage between a first feature and a second feature, this is to be read as meaning that according to one specific embodiment the exemplary embodiment has both the first feature and the second feature, and according to another specific embodiment has either only the first feature or only the second feature.

What is claimed is:

1. A pixel unit for a light sensor, the pixel unit comprising:
a plurality of sub-pixel units that are assigned to different respective temporal phases for a temporally phase shifted sampling of the light sensor, wherein each of the sub-pixel units includes:
a respective photodiode for converting a light signal into a respective photodiode signal;
a respective modulator unit for producing a respective modulator signal using the respective photodiode signal; and
a respective storage unit for storing a respective time-limited integral value of the respective modulator signal.

2. The pixel unit as recited in claim 1, wherein the respective photodiode of the respective sub-pixel unit is configured to supply a respective time-discrete signal, having a time schema, to the respective modulator unit of the respective sub-pixel unit as the respective photodiode signal of the respective sub-pixel unit, and wherein the respective modulator unit of the respective sub-pixel unit is configured as a time-discrete modulator and/or time-discrete multiplexer, to use the time schema for the production of the respective modulator signal of the respective sub-pixel unit.

3. The pixel unit as recited in claim 1, wherein the respective photodiode of the respective sub-pixel unit is configured to supply a respective continuous signal to the respective modulator unit of the respective sub-pixel unit as the respective photodiode signal of the respective sub-pixel unit, and the respective modulator unit of the respective sub-pixel unit is configured as a continuous modulator to produce a respective temporally modulated current as the respective modulator signal of the respective sub-pixel unit.

4. The pixel as recited in claim 1, wherein each of the sub-pixel units further includes:
a respective buffering unit configured to buffer the respective photodiode signal of the respective sub-pixel unit, wherein the respective modulator unit of the respective sub-pixel unit is configured to produce the respective modulator signal of the respective sub-pixel unit using the respective photodiode signal of the respective sub-pixel unit buffered by the respective buffering unit of the respective sub-pixel unit.

5. The pixel unit as recited in claim 1, wherein the respective modulator unit is configured to modify the respective photodiode signal of the respective sub-pixel unit to produce the respective modulator signal of the respective sub-pixel unit using a multiplier.

6. A light sensor having a grid structure of a plurality of pixel units, the pixel units each being subdivided into at least two sub-pixel units, each of the sub-pixel units including a respective photodiode for converting a light signal into a respective photodiode signal, a respective modulator unit for producing a respective modulator signal using the respective photodiode signal, and a respective storage unit for storing a respective time-limited integral value of the respective modulator signal, wherein, for each of the pixel units, the respective sub-pixel units of the respective pixel unit are assigned to to different respective temporal phases for a temporally phase-shifted sampling of the light sensor.

7. The light sensor as recited in claim 6, wherein:
the light sensor has a layer composite of a sensor layer and a signal processing layer;
the photodiodes of the sub-pixel units are situated in the sensor layer; and
the modulator units and/or the storage units of the sub-pixel units are situated in the signal processing layer.

8. The light sensor as recited in claim 7, further comprising:
a signal processing unit for processing the integral values stored by the storage units of the sub-pixel units.

9. The light sensor as recited in claim 8, wherein the signal processing unit is situated in the signal processing layer.

10. A method using a pixel unit, the pixel unit including a plurality of sub-pixel units, the sub-pixel units each having a respective photodiode, a respective modulator unit, and a respective storage unit, the method comprising:
each of the sub-pixel units:
converting a light signal into a respective photodiode signal, using the respective photodiode of the respective sub-pixel unit;
producing a respective modulator signal by using the respective modulator unit of the respective sub-pixel unit to process the respective photodiode signal of the respective sub-pixel unit; and
storing, by the respective storage unit of the respective sub-pixel unit, a respective time-limited integral value of the respective modulator signal of the respective sub-pixel unit; and
performing a temporally shifted sampling of the pixel unit based on assignments of the sub-pixel units to different respective temporal phases.

11. A method for generating an image using a light sensor, the light sensor having a grid structure of a plurality of pixel units, the pixel units each being subdivided into at least two sub-pixel units, each of the sub-pixel units including a respective photodiode for converting a light signal into a respective photodiode signal, a respective modulator unit for producing a respective modulator signal using the respective photodiode signal of the respective sub-pixel unit, and a respective storage unit for storing a respective time-limited integral value of the respective modulator signal of the respective sub-pixel unit, the method comprising:
for respective ones of the plurality of pixel units, reading out the respective sub-pixel units of the respective pixel unit, through phase-shifted sampling of the light sensor, to store the integral values of the respective modulator signals of the respective sub-pixel units of the respective pixel unit, wherein the respective sub-pixel units of the respective pixel unit are assigned to different respective temporal phases; and
processing the integral values to generate the image.

12. A device having units configured to carry out and/or control a method for generating an image using a light sensor, the light sensor having a grid structure of a plurality of pixel units, the pixel units each being subdivided into at least two sub-pixel units, each of the sub-pixel units including a respective photodiode for converting a light signal into a respective photodiode signal, a respective modulator unit for producing a respective modulator signal using the respective photodiode signal, and a respective storage unit for storing a respective time-limited integral value of the respective modulator signal, wherein, for each of the pixel units, the respective sub-pixel units of the respective pixel unit are assigned to to different respective temporal phases for a temporally phase-shifted sampling of the light sensor, the method comprising:
reading out the sub-pixel units through the temporally phase-shifted sampling of the light sensor, to store the integral values of the respective modulator signals of the sub-pixel units; and
processing the integral values to generate the image.

13. A non-transitory machine-readable storage medium on which is stored a computer program that is executable by a computer and that, when executed by the computer, causes the computer to perform a method using a pixel unit, the pixel unit including a plurality of sub-pixel units, the sub-pixel units each having a respective photodiode, a respective modulator unit, and a respective storage unit, the method comprising:
for each of the sub-pixel units:
converting a light signal into a respective photodiode signal, using the respective photodiode of the respective sub-pixel unit;
producing a respective modulator signal by using the respective modulator unit of the respective sub-pixel unit to process the respective photodiode signal of the respective sub-pixel unit; and
storing in the respective storage unit of the respective sub-pixel unit a respective time-limited integral value of the respective modulator signal of the respective sub-pixel unit; and
performing a temporally shifted sampling of the pixel unit based on assignments of the sub-pixel units to different respective temporal phases.

* * * * *